United States Patent

Haraikawa

[11] 4,022,297
[45] May 10, 1977

[54] DISC BRAKE FOR TWO-WHEELED VEHICLE

[75] Inventor: Tetsuo Haraikawa, Funabashi, Japan

[73] Assignee: Tokico Ltd., Japan

[22] Filed: Mar. 8, 1976

[21] Appl. No.: 664,895

[30] Foreign Application Priority Data

Mar. 20, 1975 Japan .............................. 50-33969

[52] U.S. Cl. ................................. 188/26; 188/73.3; 188/344
[51] Int. Cl.² .................. B62L 1/00; F16D 55/224
[58] Field of Search ................. 188/26, 72.4, 73.3, 188/344

[56] References Cited

FOREIGN PATENTS OR APPLICATIONS 1,378,479  12/1974  United Kingdom .............. 188/73.3

Primary Examiner—Duane A. Reger
Attorney, Agent, or Firm—Wenderoth, Lind & Ponack

[57] ABSTRACT

A disc brake for use in a two-wheeled vehicle includes a calliper straddling a rotatable disc and having an actuator disposed on one side of the disc, a guide pin disposed outside of the outer periphery of the disc and extending across the disc in a direction normal to the surface of the disc for mounting the calliper on a stationary part of the vehicle and means for preventing rotation of the calliper around the guide pin, which means is disposed inside of the outer periphery of the disc and at the aforementioned one side relative to the disc.

5 Claims, 5 Drawing Figures

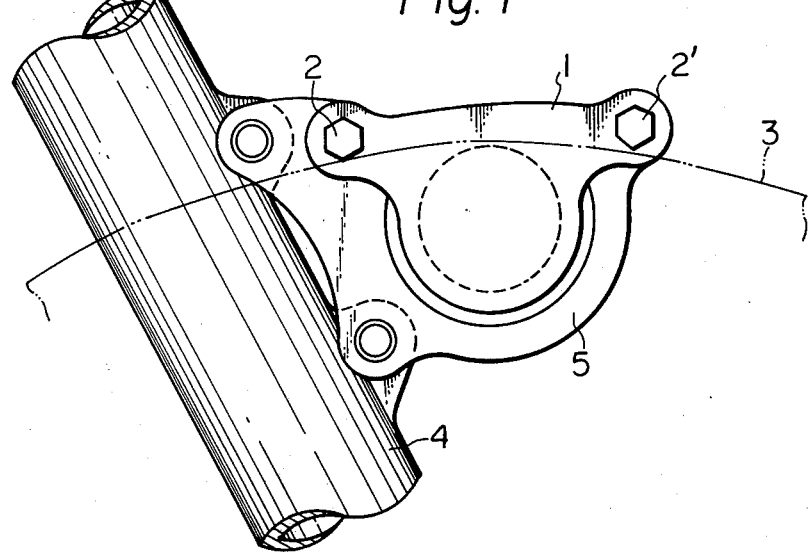
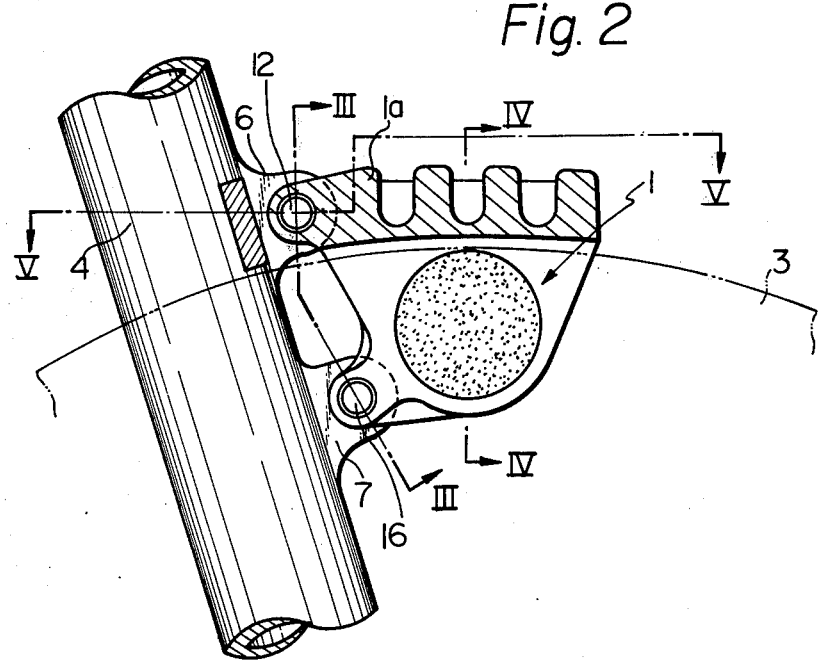

DISC BRAKE FOR TWO-WHEELED VEHICLE

BACKGROUND OF THE INVENTION

This invention relates to a disc brake for use in two-wheeled vehicles such as motor-cycles.

In prior art disc brakes for use in two-wheeled vehicles, it has been required to disassemble the calliper from the body of the vehicle or to remove the wheel and the disc from the body of the vehicle for exchanging the friction pad in the disc brake. But such pad-exchanging operation is time consuming and, moreover, the surface of the disc, pipe lines or the like will be damaged in performing such operation.

A disc brake shown in FIG. 1 has been proposed to prevent the above described difficulties, in which, two parallel slide pins 2, 2' are disposed outside of the periphery of the disc 3 for guiding sliding movement of the calliper 1. By removing one of the pins 2 or 2' and rotating the calliper 1 around the other pin 2' or 2, it is possible to exchange the friction pad easily. But, since a bracket 5 secured to a fork member 4 constituting a stationary part of the two-wheeled vehicle for supporting and guiding the pins 2, 2' should have ample strength and rigidity, such arrangement becomes expensive and heavy.

SUMMARY OF THE INVENTION

An object of the present invention is to provide a disc brake for use in two-wheeled vehicles while avoiding the aforementioned difficulties.

According to the present invention, there is a disc brake for use in a two-wheeled vehicle comprising a guide pin disposed outside of the periphery of the disc and extending across the disc in a direction normal to the surface of the disc for mounting the calliper, and means for preventing rotation of the calliper disposed inside of the periphery of the disc at one side of the calliper where the hydraulic piston is incorporated in the calliper.

BRIEF DESCRIPTION OF THE DRAWING

Description will now be made, in conjunction with the accompanying drawings of an embodiment of the present invention, in the drawings:

FIG. 1 is a front view of a prior art disc brake,

FIG. 2 is a cross section of an embodiment of a disc brake according to the present invention taken along line I-I in FIG. 3.

DETAILED DESCRIPTION OF THE INVENTION

Figure 3:
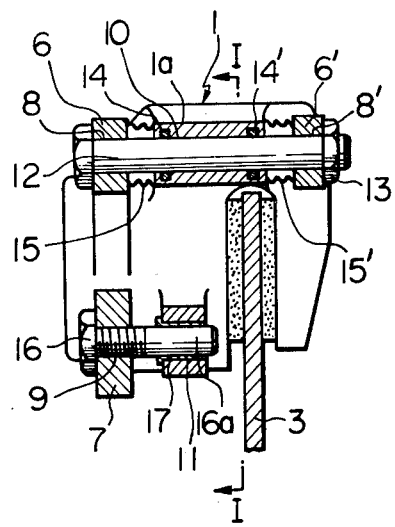
FIG. 3 is a cross-sectional view taken along line III-III in FIG. 2.
Figure 4:
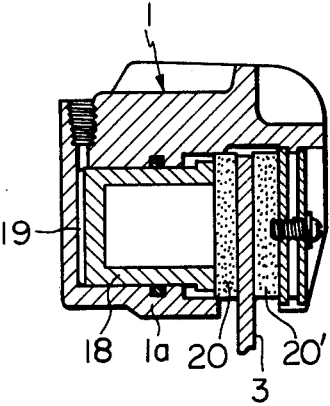
FIG. 4 is a cross-sectional view taken along line IV-IV in FIG. 2.
Figure 5:
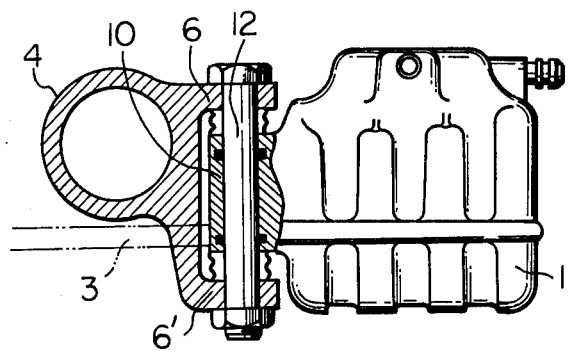
FIG. 5 is a cross-sectional view taken along line V-V in FIG. 2.

Referring FIG. 2 – FIG. 5, a fork member 4 constituting a stationary part secured to the body of a vehicle is provided with a pair of opposing lugs 6, 6' at positions outside of the outer periphery of a disc 3 and with a lug 7 at a position inside of the outer periphery of the disc 3. Referring particularly to FIG. 3 showing a cross-sectional view of the lugs, the lugs 6, 6' and 7 are provided respectively with bolt holes 8, 8' and a threaded hole 9. A housing 1a of a calliper 1 is provided with guide holes 10 and 11. A guide bolt 12 extends through bolt holes 8 and 8' in the lugs 6, 6' and the hole 10 in the housing 1a and is retained in position by means of a nut 13, whereby the calliper 1 is slidably mounted on the guide bolt 12 which in turn is secured to the lugs 6, 6' of the fork member 4. A pair of O-rings 14, 14' is disposed between the guide hole 10 and the guide bolt 12 for retaining lubricant therebetween and affording a damping effect. Shown at 15, 15' are dust preventing boots. A bolt 16 having a smooth cylindrical portion 16a at the free end thereof threadingly engages with the threaded hole 9 in the lug 7, and the cylindrical portion 16a is received within the hole 11 in the housing 1a. A resilient bush 17 is interposed between the cylindrical portion 16a and the hole 11 for attaining a suitable sliding resistance and for preventing or damping radial movement of the calliper relative to the bolt 16. As best shown in FIG. 4, a piston 18 is slidably incorporated in the calliper housing 1a. Fluid under pressure supplied from a master cylinder (not shown) or the like is introduced into a pressure chamber 19. The piston 18 urges a friction pad 20 against the disc 3, and according to reaction force thus produced, the calliper 1 slides on the bolt 12 in the direction opposite to the movement of the piston 18, thus urging a friction pad 20' against the opposite side of the disc 3 and, braking is effected between the pads 20, 20' and the disc 3.

In a disc brake having the construction described as above, braking force is transmitted, when braking is effected, from the calliper 1 through the guide bolt 12 and the lugs 6, 6' to the fork member 4. Thus, the guide bolt 12 acts to guide sliding movement of the calliper 1 and to transmit the braking force to the body of the vehicle. While the bolt 16 acts to prevent rotational movement of the calliper 1 around the bolt 12 and receives small amount of braking force as compared with the guide bolt 12. In the embodiment shown in the drawings, rotation of the calliper 1 around the guide bolt 12 is prevented by means of pin construction comprising the bolt 16, but, it will be noted any other suitable means such as, for example, a lug and detent construction or the like could be substituted if such means had been disposed inside of the outer periphery of the disc 3 at the cylinder side of the calliper.

The disc brake according to the present invention can omit the bracket necessary in the prior art disc brake, thus simplifying the construction and reducing manufacturing cost. The rotation preventing mechanism for the calliper housing can be fabricated simply and at reduced cost. Since the mechanism is disposed on the cylinder side of the calliper it is possible to minimize space for incorporating the mechanism. By releasing the rotation preventing mechanism, the friction pads can easily be exchanged without removing the brake assembly or the disc and wheel from the vehicle.

What is claimed is:

1. In a disc brake for use in a two-wheeled vehicle and of the type comprising a calliper straddling a rotatable disc and having an actuator disposed at one side of the disc, the improvement wherein said calliper is slidably mounted on a stationary part of the vehicle by means of a guide pin disposed outside of the outer periphery of the disc and extending across the disc in a direction normal to the surface of the disc, and further comprising means for preventing rotation of the calliper around the guide pin, said means being disposed at a position inside of the outer periphery of the disc and at said one side of the disc.

2. A disc brake according to claim 1, wherein, said rotation preventing means comprises a pin normally secured to the stationary part and having cylindrical free end slidably received in an opening of the calliper.

3. A disc brake according to claim 2, wherein a bush of resilient material is interposed between said cylindrical free end of the pin and the opening in the calliper.

4. A disc brake according to claim 1, wherein said guide pin is retained between two opposing lugs secured to the stationary part of the vehicle and slidably supporting the calliper thereon.

5. A disc brake according to claim 2, wherein said rotation preventing means can easily be removed, thereby enabling the calliper to rotate around the guide pin to replace worn friction pads.

* * * * *